Feb. 27, 1940. D. D. COLDREN 2,191,956

SLIP-ON COVER FOR SEATS OF PASSENGER VEHICLES

Filed Feb. 27, 1939

INVENTOR.
DARIUS D. COLDREN
BY Edward S. Durell
ATTORNEYS.

Patented Feb. 27, 1940

2,191,956

UNITED STATES PATENT OFFICE 2,191,956

SLIP-ON COVER FOR SEATS OF PASSENGER VEHICLES

Darius D. Coldren, Schuylkill Haven, Pa.

Application February 27, 1939, Serial No. 258,794

2 Claims. (Cl. 155—182)

My invention relates to improvements in slip-on covers for the seats and backs of seats of passenger vehicles.

Among the objects attained by this invention are an expansible cover that is quickly and readily put on and removed; and one which is adaptable to the varying sizes and contours of seats and their backs. Another object of the invention is to provide a slip-on cover which readily fits the shape of the seat and back and is securely attached thereto without the use of tabs, drawcords, or other independent fastening devices such as tacks and the like.

Some of the advantages of such improvements are that the slip-on cover herein provided for assures a good fit and a neat appearance; that it is readily put on as well as removed; and that it is quickly and securely attached and held in place without the use of fastening devices.

With these and other objects and advantages in view, my invention consists of the improvements hereinafter particularly described and claimed.

In the accompanying drawing which illustrates the invention,

Figure 1:
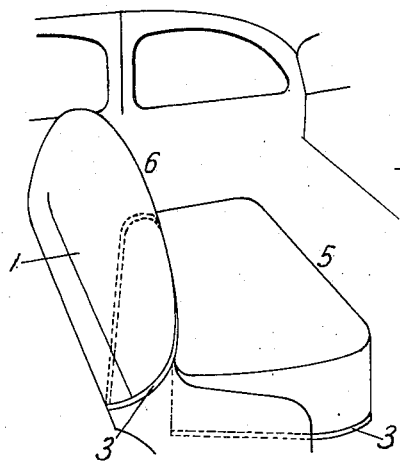
Figure 1 is a perspective view showing my improved slip-on covers on the seat and back of an automobile seat.
Figure 2:
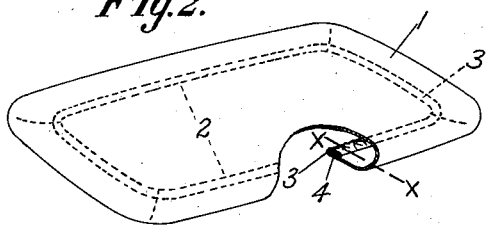
Figure 2 is a perspective view of a cover before it is put on seat or back.
Figure 3:
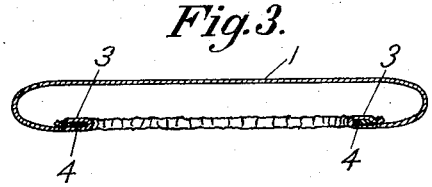
Figure 3 is a transverse sectional view of the cover before being put on a seat or back.
Figure 4:
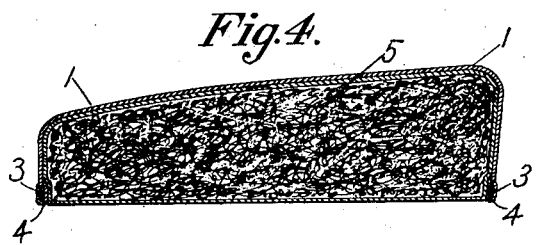
Figure 4 is a transverse sectional view of a seat with the cover in position.
Figure 5:
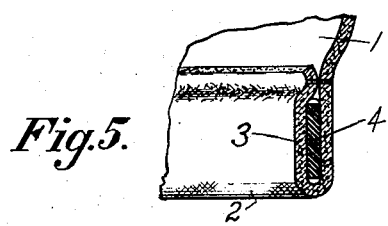
Figure 5 is an enlarged transverse sectional view on line $x$—$x$ of Figure 2 showing tubular hem and enclosed elastic band.

The slip-on cover, designated as a whole by the reference numeral 1, is made of an elastic material or fabric, preferably knitted goods. It is bag-like in formation and is provided with an expansible opening or mouth 2. This opening is finished with a circuitous, tubular, hem 3, within which is confined an elastic band, tape, or similar elastic element 4 to normally retain said opening 2 in a contracted state.

The opening 2 with its hem as aforesaid, is made large enough to allow the cover 1 to be slipped on the seat or back, and enclose same as shown in Figure 1 of the drawing. In this view 5 designates the seat and 6 the back. In place, with the elastic fabric evenly distended and the contractible hem holding the cover in close to the seat or back, the appearance is uniformly good. The cover conforms to the seat or back and is smooth all over. The full width of the opening 2 will readily admit seats and backs of various dimensions, while the elasticity of the cover will cause it to conform to the shape and size thereof, and the contractibility of the element 4 in the hem will maintain a secure attachment between the cover and seat or back.

The elastic element 4 in the hem of the cover is less easily distended than the fabric of the cover hence the opening 2 is held normally in a contracted state before the cover is put on. In such contracted state the fullness of the opening 2 produces gathers in the fabric of the cover at the hem.

Figure 6:
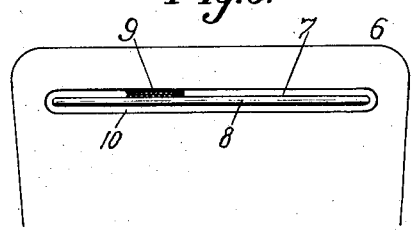
Figure 6 is a rear view of the cover on a back showing a slot-like opening to admit the cross-bar or hanger which is usually provided on the back to hold rugs or other articles.

In Figure 6 which shows a cover adapted for a seat back, an expansible, longitudinal, opening 7, is provided for the reception of the cross-bar 8 on which are usually hung automobile rugs, covers and other articles. Normally this opening is kept closed by an elastic element 9 around its periphery, the same being enclosed in a tubular hem 10, or otherwise made a component part of the cover around this opening.

Figure 7:
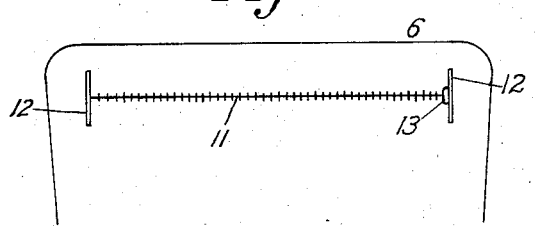
Figure 7 is a view somewhat similar to that in Figure 6 but showing a modified form of opening for the cross-bar or hanger, wherein a zipper closure is provided for the opening.

In Figure 7 is shown a cover for the back of a seat, with a longitudinal slit or opening 11, of modified construction. Instead of the opening 7 shown in Figure 6, with its elastic element 9, a short transverse slit 12 is provided at each end of the longitudinal opening 11, with a zipper 13 for closure of said longitudinal opening when not in use. This modified form, as well as that shown in Figure 6 of the drawing, is adaptable to the seat also, as said openings 7 and 11 are normally closed, except when the cover is used on the back of a seat having a cross-bar 8 on the rear thereof.

Having thus fully described my invention, what I claim as new and desire to secure by Letters Patent of the United States, is:

1. A bag-like slip-on cover for seats and backs of seats of passenger vehicles, comprising an elastic body having an extensible opening held normally in a contracted state by an elastic, peripheral, element, and a transverse slot-like opening in the body portion for the reception of a cross-bar projecting from the back of the seat, and a closure for said transverse slot-like opening when not in use.

2. A bag-like slip-on cover for seats and backs of seats of passenger vehicles and the like, comprising an elastic body of knitted fabric having an extensible opening, and having a peripheral hem for said opening which normally engages the front, back and side faces of the article, a circuitous, elastic band enclosed by said hem and of greater contractibility than the body of the cover, and a transverse slot-like opening in said body for the reception of a cross-bar projecting from the back of the seat, and a closure for said transverse, slot-like, opening.

DARIUS D. COLDREN.